United States Patent Office 3,392,396
Patented July 9, 1968

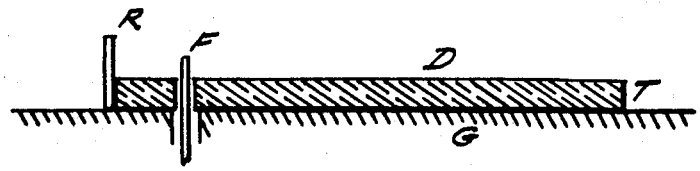
Fig.1
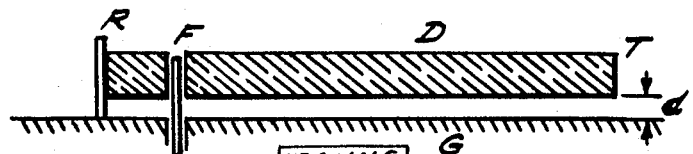
Fig.2
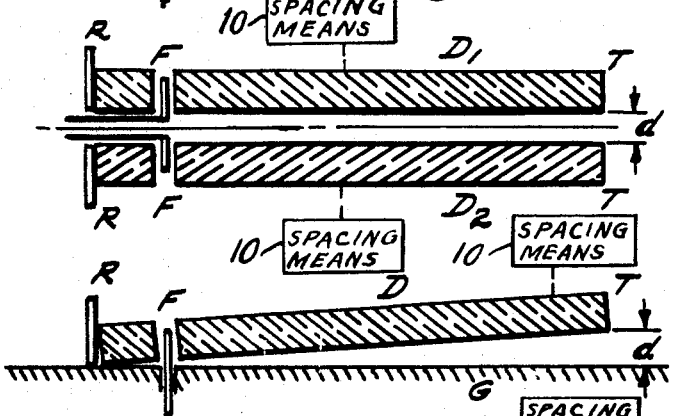
Fig.3
Fig.4a
Fig.4b
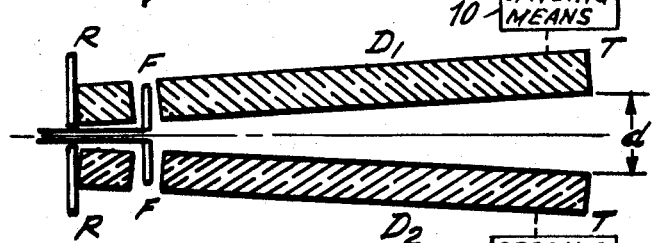
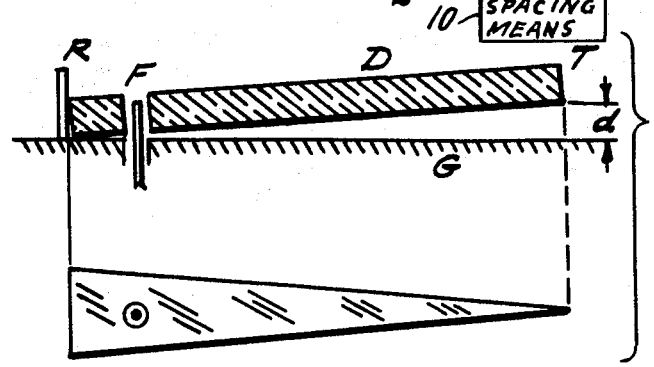
Fig.5
INVENTOR.
HERMANN W. EHRENSPECK

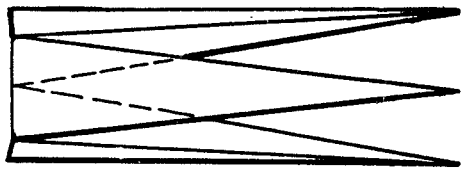
Fig.8a  Fig.8b
  
Fig.9a  Fig.9b  Fig.9c
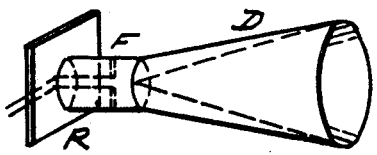 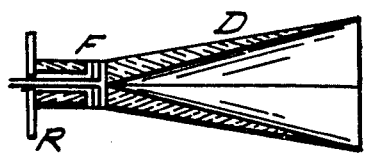
Fig.10a  Fig.10b
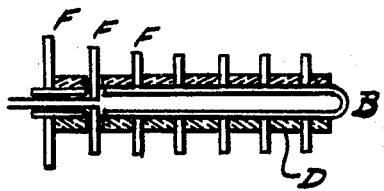 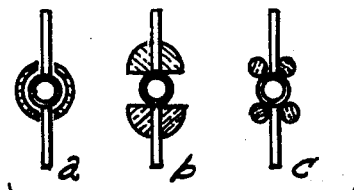
Fig.11  Fig.12
INVENTOR.
HERMANN W. EHRENSPECK though from a virtual aperture comparable to the physical aperture of a horn. It can be shown that the pattern

3,392,396
TUNABLE ENDFIRE SURFACE WAVE ANTENNA
Hermann W. Ehrenspeck, 94 Farnham St.,
Belmont, Mass. 02178
Continuation of application Ser. No. 216,001, Aug. 9, 1962. This application Dec. 28, 1964, Ser. No. 421,735
8 Claims. (Cl. 343—755)

ABSTRACT OF THE DISCLOSURE

An endfire antenna having surface wave propagation along the longitudinal axis thereof and being tunable to maximum gain for any preselected frequency within a predetermined frequency range. The endfire antenna includes a transverse feed and endfire reflector with associated guide element. Tunability is provided by the adjustment of a preselected phase velocity along the surface wave structure in accordance with a preselected dimension and position of the guide element.

---

The invention described herein may be manufactured and used by or for the United States Government for governmental purposes without payment to me of any royalty thereon.

This is a continuation of application Ser. No. 216,001 filed Aug. 9, 1962, now abandoned.

This invention relates to endfire antennas, and particularly to methods and means for incorporating tunability into such an antenna.

It is characteristic of endfire antennas that a surface wave excited at one end by the feed, travels along the antenna structure to the opposite end with a phase velocity smaller than that of light. Assuming negligible radiation from the feed, radiation takes place only at the antenna end opposite the feed, where the energy is radiated as though from a virtual aperture comparable to the physical aperture of a horn. It can be shown that the pattern of such an endfire antenna is a function of the width of the aperture and the amplitude and phase distribution in it.

The present invention incorporates tunability into an endfire antenna of elongate dimensions by controlling the phase velocity of the energy supplied to the elongate guide element, or elements, near one end thereof, propagating longitudinally thereof, in surface-guided fashion for radiation from the opposite end thereof; the phase velocity control being accomplished by appropriate matching of cross-section areas to physical disposition and attitude of the principal guide element, or elements, in relation to an adjacent ground plane or in relation to each other.

In the drawings:

FIGURES 1 and 2 show a single guide element antenna, with transverse feed and end-reflector, in positions respectively flat against, and vertically spaced from, a ground plane;

FIGURE 3 shows a dual guide element antenna in which each of the two principal elements are spaced apart but parallel;

FIGURES 4a and 4b show the same structures as FIGURES 2 and 3, respectively, but with the guide elements non-parallel to the ground plane, or to each other;

FIGURE 5 shows an arrangement similar to FIGURE 4a, but with a tapering cross-section incorporated in the guide element;

Figure 6A:
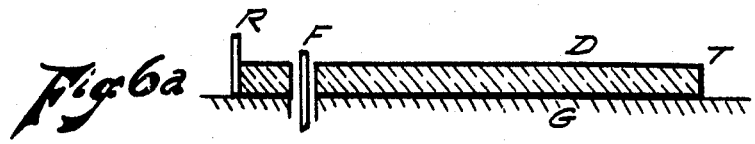
FIGURE 6a shows one longitudinal cross-sectional shape of a single guide element antenna, with transverse feed and end reflector, in a position flat against a ground plane.
Figure 6B:
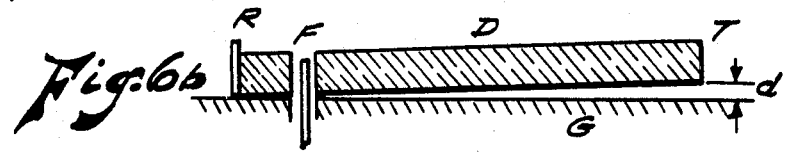
FIGURE 6b shows a second longitudinal cross-sectional shape of a single guide element antenna, with transverse feed and end reflector, with the guide element arranged at a predetermined angle from the ground plane.
Figure 6C:
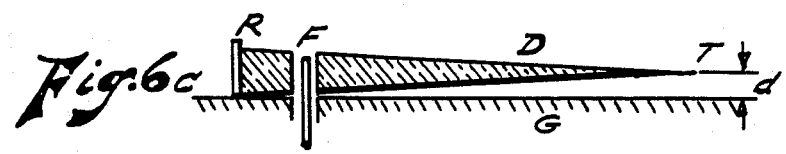
FIGURE 6c shows a third longitudinal cross-sectional shape of a single guide element antenna having a ground plane, with transverse feed and end reflector with the guide element having a predetermined constant taper.
Figure 6D:
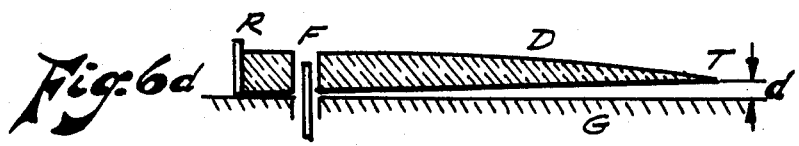
Figure 6E:
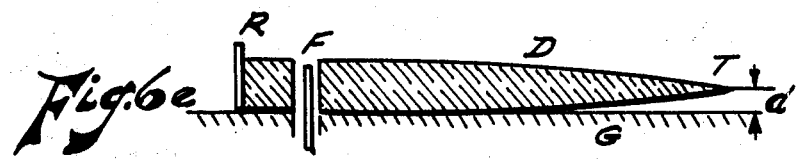
Figure 6F:
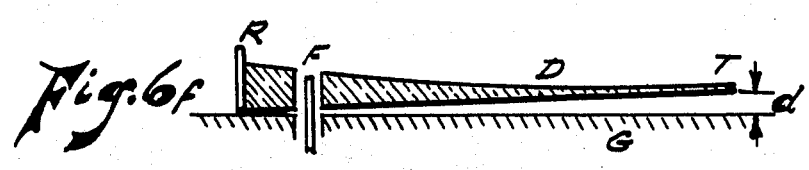
Figure 6G:
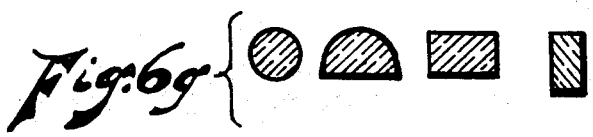
Figure 7A:
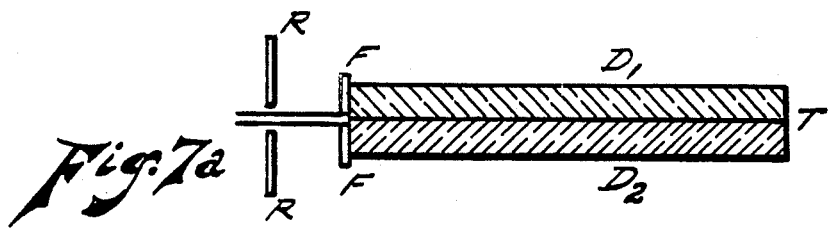
Figure 7B:
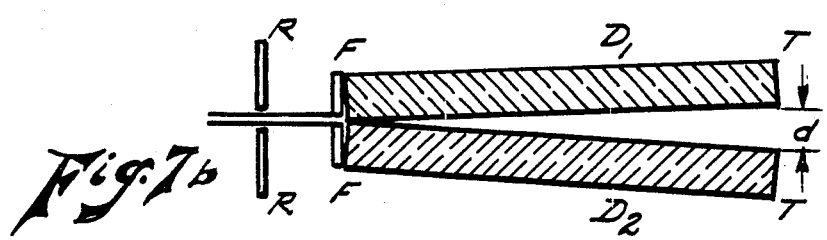
Figure 7C:
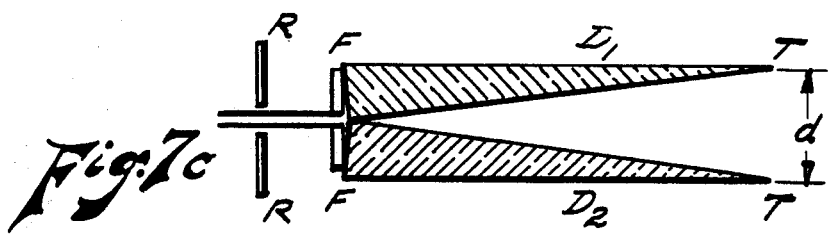
Figure 7D:
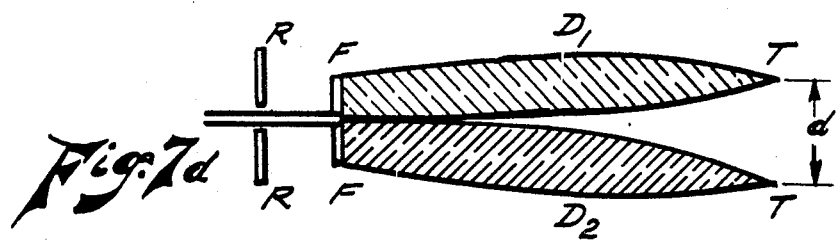
Figure 7E:
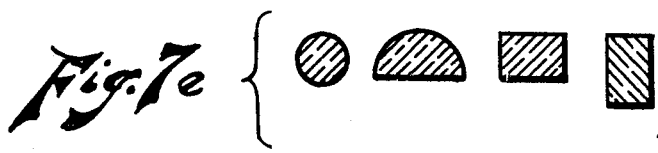

FIGURES 6d, 6e, and 6f show a fourth, fifth and sixth longitudinal cross-sectional shape, respectively, of a single guide element antenna having a ground plane, with transverse feed and end reflector, with each of the guide elements thereof having a different predetermined taper in accordance with a desired change of phase velocity along the guide element;

FIGURE 6g shows various transverse cross-sectional views which may be utilized for the guide elements of FIGURES 6a through 6f;

FIGURE 7a shows one longitudinal cross-sectional shape of a free space model of a tunable endfire antenna, with transverse feed and end reflector, with the guide elements thereof being parallel;

FIGURE 7b shows a second longitudinal cross-sectional shape of a free space model of a tunable endfire antenna, with transverse feed and end reflector, with the guide elements thereof being at an angle to each other;

FIGURE 7c shows a third longitudinal cross-sectional shape of a free space model of a tunable endfire antenna, with transverse feed and end reflector, with the guide elements thereof having a constant predetermined taper;

FIGURE 7d shows a fourth longitudinal cross-sectional shape of a free space model of a tunable endfire antenna, with transverse feed and end reflector, with the guide elements thereof having a predetermined non-constant taper;

FIGURE 7e shows various transverse cross-sectional shapes which may be utilized for the guide elements of FIGURES 7a–7d;

FIGURES 8 and 9 show four-part guide element structures;

FIGURE 10 shows a guide element in the form of a hollow cone, or horn; and FIGURES 11 and 12 show the invention applied to a Yagi-type antenna.

The gain of an endfire antenna depends both on the phase velocity of the surface wave traveling along it and on the length of the structure. However, for a given antenna length, there is an optimum phase velocity, above and below which the gain decreases. In order to get optimum gain, the phase velocity of the traveling wave has to be adjusted so that a total phase retardation of about 180° is achieved along the structure.

The adjustment of the phase velocity on endfire antennas can be made by different methods. In the case of the Yagi antenna, it can be adjusted by changing the length of the dipoles and their spacing; in the case of the helix antenna, by choosing different diameters of the helix turns and their spacing and in the case of the dielectric rod antenna, by choosing different dimensions of the dielectric rod.

Most practical antennas use a constant phase velocity along the surface wave structure. It has been found, however, that certain changes in the structure, which more or less result in a nonconstant phase velocity and amplitude distribution, give slightly better results in respect to gain and pattern. For example, an extensive study of this problem applied to Yagi antennas showed that tapering the single elements in their lengths or spacings results in lower side or back lobes in the pattern.

According to the invention it is possible to obtain a tunable endfire antenna if a method is found that allows an easy adjustment of the phase velocity. For studying this problem the dielectric rod antenna, imaged on a large ground plane as shown in FIGURE 1, was chosen as an endfire antenna. In this sketch D is a dielectric rod, made from polystyrene, Lucite, glass or some other low loss dielectric material, lying directly on a large ground plane G; F, the feed, is a half dipole perpendicular to the ground plane, excited from underneath; R is a reflector, either linear or plane; and T indicates the termination of the rod.

Maximum gain is obtained from this antenna if the dimensions of the rod are chosen such that the phase velocity of the surface wave propagating from R to T has the correct value corresponding to the length of the dielectric rod. It can be shown that this treatment of the problem yields the same results in respect to radiation pattern and gain as two dielectric rods of the same dimensions and shape arranged one above the other in free space.

The phase velocity may be considered as a constant along the rod if perturbations are neglected in the immediate neighborhood of the feed-reflector combination. The shape of the cross section of the dielectric rod is only of minor influence on gain and pattern, if the right phase velocity is provided. Therefore, a semicircular, quadratic, or rectangular shape of the rod may be used as well as a circular shape. It has been found that in a first approximation only the area of the cross section is responsible for the phase velocity of the surface wave. Increasing as well as decreasing this area results in a gain decrease. Generally, increasing the area results in a decrease of the phase velocity on the dielectric rod; in other words, in a slower propagation of the surface wave.

If the rod is lifted up parallel to the ground plane by a distance $d$ above it, as shown in FIGURE 2, the phase velocity of the wave propagation along the rod becomes faster with increasing $d$. By continuously changing $d$, an optimum distance can be found for which the optimum phase velocity on the rod is achieved, and consequently, maximum gain is obtained. If the frequency is changed, the antenna can always be readjusted for this phase velocity by changing its distance above the ground plane provided that the cross section of the rod is chosen correctly. Therefore, the antenna may be tuned for maximum gain for a given frequency.

In order to achieve the tunability for a certain frequency, the dimensions of the dielectric rod have to be chosen so that the phase velocity of the surface wave building up on the rod is smaller than that which would produce maximum gain for the given length and frequency. Consequently, a rod must be chosen with a cross section larger than that needed for providing the optimum phase velocity for maximum gain.

The frequency range that may be covered by such an antenna depends on the dielectric constant of the rod material, its shape and cross section, and its length. Let us assume a dielectric rod antenna having such dimensions that it has optimum gain for a certain frequency when it lies directly on a ground plane. If the frequency is changed, not only is the cross section of the rod now incorrect for maximum gain, but also the electric length of the antenna, measured in wavelengths, is changed. The antenna is therefore out of adjustment for relatively small frequency changes. The frequency curve is nonsymmetrical around the frequency for which the antenna had been adjusted. The lower the frequency, the faster the gain decreases, because the electric length is becoming smaller resulting in lower gain. As the frequency becomes higher, the electric length increases, resulting in higher gain. At the same time the phase velocity becomes too low for the new electric length, resulting in gain decrease. In the first case the gain decreases fast with frequency, and in the second case the gain decreases more slowly; but a cutoff frequency is approached that interrupts any wave propagation on the dielectric rod, thus causing a sharp gain decrease.

The behavior of the new tunable endfire antenna is quite different from that of the normal dielectric rod antenna. Whether the frequency is increased or decreased, the antenna can still be tuned for maximum gain for the new frequency and electric length. The frequency range of the antenna for maximum gain can be chosen by the dimensions of the rod. The larger the cross section of the rod compared to that cross section which produces maximum gain for the given length, the wider the frequency range will be. However, the larger the cross section of the rod, the larger the distance the rod must be lifted for tuning the antenna for the given frequency. This may cause unfavorable dimensions of the antenna and difficulties in coupling the energy from the feed into the dielectric rod.

FIGURE 3 shows a free space model of a tunable endfire antenna. Two identical dielectric rods of the same shape and dimensions $D_1$ and $D_2$ are fed by a symmetric feed F (for example, a dipole) with a reflector R. The distance $d$ between $D_1$ and $D_2$ is changed for the tuning procedure for example by conventional spacing means 10, as illustrated. In order to tune for the same frequency, the distance has to be double that of the distance between the single rod and the ground plane.

It should be mentioned that the method of tuning endfire antennas for maximum gain according to this invention has nothing in common with the method of using a combination of two or more separate endfire antennas spaced at a certain distance from each other for obtaining higher gain. The single antennas are generally mounted at such a distance from each other that only a very small or no interaction occurs between them. The gain increase is achieved by multiplying the radiation characteristics of the single elements with their group characteristic. In the case of the tunable endfire antenna, however, the interaction between the two parts, causing changes in the phase velocity of the combination, is basic to the functioning of the antenna. Therefore, it is again re-emphasized that the distance between the aforesaid two parts is such that the interaction therebetween is of sufficient magnitude to cause the requisite changes in the phase velocity of the combination.

As mentioned before, a better side and backlobe level can be expected from an endfire antenna that is adjusted for a certain non-constant phase velocity and amplitude distribution. Although a theoretical solution for finding the best taper for maximum gain and low sidelobe level is not yet known, it has been found by experiment that practically the same gain can be obtained, if the antenna is adjusted for the optimum constant phase velocity that corresponds to the length of the surface wave structure, or if a taper is chosen such that the average phase velocity over the structure is approximately the same as this constant phase velocity.

Using this result the tunable endfire antenna may be constructed much more easily than is shown in FIGURES 2 and 3. For example, in the case of the dielectric rod antenna, tuning can be accomplished by lifting up the end opposite the feed, as shown in FIGURES 4a and 4b for example by conventional spacing means 10, as illustrated. (The letters have the same meaning as in FIGURES 1–3.) The phase velocity now increases from the feed side F of the antenna towards the radiating end T which for the tuning procedure must be raised up to about double that height for constant phase velocity. This tuning method has a great advantage over the method described in FIGURES 2 and 3 because the area around the feed is changed very little by lifting the rod; consequently, the coupling of the energy into the rod is negligibly affected. A further advantage of this method is that it provides a slow change from a lower phase velocity at the feed point to a higher phase velocity at the radiating antenna end, thus causing a better matching to free space. Therefore, lower reflection losses and slightly increased gain can be expected.

A study of the near field of a tuned endfire antenna with constant phase velocity has verified this assumption. While there is a relatively high standing wave ratio on the wave channel in case of constant phase velocity, it becomes much smaller in the case of tapered phase velocity, and the slight gain increase is obtained as expected.

Further extensive experiments have shown that both tuning methods are applicable in practice and bring the expected results. For example, a series of dielectric rod antennas having constant diameters and varying in length from 1 to 30 wavelengths could easily be tuned for maximum gain in the forward direction. By using the second tuning method, non-constant phase velocity resulted in lower side and backlobes as predicted. The absolute gain of each of the tuned endfire antennas had the value expected from a normal endfire antenna with the same length and adjusted for maximum gain.

So far, only the phase velocity on the tuned endfire antenna has been discussed. In the case of the ordinary endfire antenna, for example a long yagi, both the phase velocity and the amplitude distribution are constant along the surface wave structure, if perturbations of the field in the vicinity of the feed are ignored. This is also true in the case of the dielectric rod antenna. If this antenna is tuned for maximum gain by raising it from the ground plane in such a way that it stays parallel to the plane, there is still constant phase and amplitude distribution along the surface wave structure as long as the form and dimensions of the rod are kept constant. If, on the other hand, it is tuned by raising only the radiating antenna end, phase velocity and amplitude distribution are changed simultaneously with the phase velocity increasing towards the radiating antenna end. It is impossible, however, to fulfill the phase condition for maximum gain and at the same time get a special amplitude distribution needed for achieving a certain form of the radiation pattern, for example a pattern with highest gain or low side lobes.

According to this invention any amplitude distribution wanted can be obtained, if the cross section of the dielectric rod is tapered from one end to the other. This taper causes a change again in the phase distribution along the antenna, such that the lifting angle of the rod has to be readjusted for optimum phase velocity. Despite the complicated interaction between all these effects, the antenna can always be tuned for maximum gain. The only difference between different antennas will be the shape of the rod and the angle of elevation from the ground plane.

Preliminary experiments with a dielectric rod endfire antenna of rectangular shape in cross section and linearly tapered in thickness in the longitudinal axis, as shown in FIGURE 5, have led to the expected results. All side and backlobes were more than 20 db in amplitude below the main beam, and the antenna had the proper gain according to its length. Even better patterns may be obtained by giving some type of optimum shape to the dielectric rod. Some of the numerous possible shapes are sketched in FIGURES 6a, b, c, d, e, and f which show cross sections through the longitudinal axis of some tunable dielectric rod antennas. All these tapers can be applied in the vertical as well as in the horizontal plane. The cross sections of the rods may be, for example, rectangular, cylindrical, or elliptical and may have any taper in length as shown in FIGURE 6g.

Everything that has been said up to now about tunable dielectric rod antennas above a ground plane is still valid if the imaged antenna is converted to a symmetric antenna by adding another, identical dielectric rod. Some symmetric free space models of tunable endfire antennas, as developed from the imaged dielectric rod antennas, are shown in FIGURES 7a–7d.

Tunability is achieved by moving the two rods away from each other in such a way that they either remain parallel or open like the jaws of a pair of pliers. A pattern with prescribed gain and sidelobe level can be obtained by choosing the proper shape of the rod.

Referring to FIGURES 6 and 7, the dielectric can terminate from T to R as in FIGURE 6 or can go from T to F as shown in FIGURE 7.

Besides the aforementioned two-rod tunable endfire antenna, there exists an unlimited number of ways to build tunable dielectric endfire antennas by using more than two rods. For example, four rods could be arranged so that the antenna can be used for vertical and horizontal polarization at the same time. FIGURE 8 is a sketch of such an antenna; the feed, which could be a crossed dipole, is not shown; FIGURE 8(a) shows a cross section through the feed side of the rod combination, and FIGURE 8(b) shows a side view of the rods when the four jaws are opened for tuning. The antenna is a conical shaped dielectric rod when it is closed. Mechanically much simpler would be a combination of four cylindrical or quadratic rods, as shown in cross section in FIGURES 9a, b, and c. The single rods may have a constant cross section along the antenna; they may be tapered towards the end, or may have some other shapes for obtaining a certain pattern.

Still another solution would be to build the antenna like a dielectric horn having tapered walls, that may be cut into two or more segments. Tunability is obtained by moving the segments apart from each other. A sketch of this type of antenna is shown in FIGURE 10, where (a) shows a perspective view of the horn D and (b) which is similar to FIGURE 8, is a cross section through it in its symmetry axis. Again, F and R indicate feed and reflector. This antenna could be used for any polarization, depending on the type of feed.

The tuning method according to this invention can also be used to make a Yagi antenna tunable for maximum gain if it is combined with a dielectric rod. FIGURE 11 shows a cross section through the supporting boom B of a tunable Yagi antenna. R, F, and E indicate reflector, feed, and director; P is the dielectric tuning device. Some of the many possible arrangements are sketched in FIGURES 12a, b, and c, showing cross sections through the rods in a plane transverse to the supporting boom. P may be a dielectric tube surrounding the boom and cut in two halves as shown in FIGURE 12a. The tuning device may also consist of two dielectric rods having any shape in cross section (FIGURE 12b); or more than two rods, for example, four rods mounted on both sides of the dipoles (FIGURE 12c).

If the Yagi antenna should be tunable over a certain frequency range, the directors should be adjusted for maximum gain at the lowest frequency, and with the dielectric tuning device touching the supporting boom. With increasing frequency, the rods have to be moved out from the boom. The tuning range depends on the amount of dielectric material that is surrounding the boom. Tapering will again result in a pattern with a lower sidelobe level. The tuning methods described above, and related methods may be used for tuning other types of endfire antennas that are based on surface wave propagation along their structure. Examples are the helix and the zig-zag antenna.

What I claim is:

1. An endfire antenna having surface wave propagation along the longitudinal axis thereof and being tunable to maximum gain for any preselected frequency within a wide predetermined frequency range comprising first and second elongated dielectric rods spaced a distance apart much smaller than a quarter wavelength and operating in combination and disposed in free space, each of said rods having preselected dimensions both in cross section and in length to provide said wide predetermined frequency range, a combination of a single reflector and single dipole disposed at corresponding ends of each of said rods and in the above-recited sequence, said dipole simultaneously energizing the combination of both of said rods at said corresponding ends to propagate a surface wave down the longitudinal axis thereof to radiate at the other corresponding ends of said rods, and means operating to control the magnitude of interaction between said two rods to cause a change in the phase velocity of said surface wave of said combination to provide said maximum gain for any said preselected frequency within said wide predetermined frequency range, said control means including physically positioning said pair of rods in a preselected relationship to each other both at a predetermined distance and a predetermined attitude to provide the requisite change in said phase velocity.

2. An endfire antenna having surface wave propagation along the longitudinal axis thereof and being tunable to maximum gain for any preselected frequency within a wide predetermined frequency range comprising a Yagi antenna having at least one reflector element, one driven element, and one director element disposed along the longitudinal axis thereof and in the above-recited sequence, first and second elongated dielectric rods operating in combination and having the longitudinal axis thereof in parallel relationship to said longitudinal axis of said Yagi antenna, and means to space said dielectric rods from said Yagi antenna and each other to provide interaction therebetween to cause a change of phase velocity of said surface wave ensuring maximum gain for any said preselected frequency over said wide predetermined frequency range.

3. An endfire antenna having surface wave propagation along the longitudinal axis thereof and being tunable to maximum gain for any preselected frequency within a wide predetermined frequency range comprising a Yagi antenna having a boom supporting reflector, feed and director elements thereof, first and second dielectric elements in combination with said Yagi antenna surrounding said boom and extending along the length thereof, and means operating to control the magnitude of interaction between said two dielectric elements and said Yagi antenna to cause a change in the phase velocity of said surface wave to provide said maximum gain for any said preselected frequency within said wide predetermined frequency range.

4. An endfire antenna having surface wave propagation along the longitudinal axis thereof and being tunable to maximum gain for any preselected frequency within a wide predetermined frequency range comprising a Yagi antenna having a boom supporting reflector, feed, and director elements thereof, first, second, third, and fourth dielectric rods positioned around said boom and in parallel relationship thereto and extending along the length thereof, and means to space said dielectric rods from said boom to cause a change in the phase velocity of said surface wave to provide said maximum gain for any said preselected frequency within said wide predetermined frequency range.

5. An endfire antenna having surface wave propagation along the longitudinal axis thereof and being tunable to maximum gain for any preselected frequency within a wide predetermined frequency range comprising first and second dielectric elements in combination and positioned in free space, each in the form of an elongated rod having preselected dimensions both in cross section and length to provide said wide predetermined frequency range, said elements having a parallel relationship and spaced a distance apart much smaller than a quarter wavelength, single dipole means to simultaneously energize both of said elements at corresponding ends thereof, and means to space said elements from each other a predetermined distance while retaining said parallel relationship to control the magnitude of interaction therebetween to cause a change in phase velocity of said surface wave to provide said maximum gain for any said preselected frequency within said wide predetermined frequency range.

6. An endfire antenna as described in claim 5 and further including single reflector means operating in combination with said single dipole means.

7. An endfire antenna having surface wave propagation along the longitudinal axis thereof and being tunable to maximum gain for any preselected frequency within a wide predetermined frequency range comprising first, second, third, and fourth elongated dielectric rods in parallel relationship, each of said rods having preselected dimensions both in cross section and length to provide said wide predetermined frequency range, said first and third rods operating as a first pair and being disposed in the horizontal plane and said second and fourth rods operating as a second pair being disposed in the vertical plane, means to simultaneously energize at corresponding ends said first and second pair in said horizontal and vertical planes, respectively, said first pair radiating horizontally polarized energy with said second pair simultaneously radiating vertically polarized energy, and means to space said rods from each other a predetermined distance to control the magnitude of interaction therebetween to cause a change in phase velocity of said surface wave to provide said maximum gain for any said preselected frequency within said predetermined frequency range.

8. An endfire antenna having surface wave propagation along the longitudinal axis thereof and being tunable to maximum gain for any preselected frequency within a wide frequency range comprising first and second elongated dielectric rods having a parallel relationship and spaced a distance apart much smaller than a quarter wavelength and operating in combination in free space, each of said rods having preselected dimensions both in cross section and length to provide said wide predetermined frequency range, a combination of a reflector and dipole feed to energize said combination of rods at corresponding ends thereof, and means to space said rods from each other a predetermined distance to control the magnitude of interaction therebetween to cause a change in the phase velocity of said surface wave of said combination to provide said maximum gain for any said preselected frequency within said wide predetermined frequency range.

References Cited

UNITED STATES PATENTS

| | | | |
|---|---|---|---|
| 2,663,797 | 12/1953 | Kock | 343—785 |
| 2,727,233 | 12/1955 | Eyges | 343—785 |

FOREIGN PATENTS

| | | |
|---|---|---|
| 867,356 | 4/1961 | Great Britain. |
| 837,781 | 1/1956 | Germany. |

ELI LIEBERMAN, *Primary Examiner.*